United States Patent
Jang et al.

(10) Patent No.: US 8,452,354 B2
(45) Date of Patent: May 28, 2013

(54) MOBILE COMMUNICATION TERMINAL

(75) Inventors: Chang-Yong Jang, Gyeongsangnam-Do (KR); Yong-Hee Lee, Gyeonggi-Do (KR); Min-Soo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1120 days.

(21) Appl. No.: 11/923,417

(22) Filed: Oct. 24, 2007

(65) Prior Publication Data

US 2008/0261659 A1 Oct. 23, 2008

(30) Foreign Application Priority Data

Apr. 23, 2007 (KR) .................. 10-2007-0039528
Apr. 27, 2007 (KR) .................. 10-2007-0041477
Apr. 27, 2007 (KR) .................. 10-2007-0041487

(51) Int. Cl.
*H04M 1/00* (2006.01)

(52) U.S. Cl.
USPC ............. 455/575.4; 455/550.1; 455/556.1; 455/556.2

(58) Field of Classification Search
USPC .......... 361/679.01, 679.06, 679.09, 679.2, 361/679.3, 679.12, 679.44, 683; 455/90.3, 455/344–350, 550.1, 556.1, 556.2, 575.4
See application file for complete search history.

(56) References Cited

U.S. PATENT DOCUMENTS

| | | | |
|---|---|---|---|
| 2006/0025184 A1* | 2/2006 | Cho et al. | 455/575.4 |
| 2006/0111160 A1* | 5/2006 | Lin et al. | 455/575.3 |
| 2006/0135225 A1 | 6/2006 | Lin et al. | |
| 2006/0211460 A1* | 9/2006 | Jeong et al. | 455/575.4 |
| 2007/0054710 A1 | 3/2007 | Pan | |
| 2007/0082718 A1* | 4/2007 | Yoon et al. | 455/575.4 |
| 2007/0115255 A1 | 5/2007 | Pan | |
| 2007/0218723 A1* | 9/2007 | Kim | 439/142 |
| 2008/0207272 A1* | 8/2008 | Thornton et al. | 455/566 |

FOREIGN PATENT DOCUMENTS

| | | |
|---|---|---|
| CN | 1946091 A | 4/2007 |
| TW | I278216 | 4/2007 |

* cited by examiner

*Primary Examiner* — George Eng
*Assistant Examiner* — Dinh P Nguyen
(74) *Attorney, Agent, or Firm* — Birch, Stewart, Kolasch & Birch, LLP

(57) ABSTRACT

A mobile communication terminal including a first body, a second body slidably connected to the first body and moveable between a first position and a second position, and a slide module connecting the first body to the second body. The slide module is configured to guide the second body along a curved path between the first position and the second position such that the second body moves in both a lateral and longitudinal direction with respect to the first body.

24 Claims, 20 Drawing Sheets

MOBILE COMMUNICATION TERMINAL

CROSS-REFERENCE TO RELATED APPLICATIONS

This application claims priority to Korean Application No. 10-2007-0039528, filed on Apr. 23, 2007, Korean Application No. 10-2007-0041487, filed on Apr. 27, 2007 and Korean Application No. 10-2007-0041477, filed on Apr. 27, 2007, all of which are herein expressly incorporated by reference in their entirety.

BACKGROUND OF THE INVENTION

1. Field of the Invention

The present invention relates generally to a mobile communication terminal, and more particularly, to a mobile communication terminal in which a second body is slidable in both a lateral and longitudinal direction with respect to a first body so as to expose/cover a portion of the first body.

2. Description of Related Art

In general, a mobile communication terminal is an electronic device that is portable and capable of performing a wireless communication function. Such mobile communication terminals may be provided as a single body, such as a bar type terminal, or two or more bodies that are connected to perform a relative motion with respect to each other. The types of terminals in which two or more bodies are connected to perform a relative motion may include a type of terminal in which the two or more bodies are rotatably connected to each other, such as a folder type terminal, a swing type terminal, or a swivel type terminal, and a type of terminal in which the two or more bodies are slidably connected to each other, such as a slide type terminal.

In the slide type mobile communication terminal, for example, one body is stacked on, or overlays, another body, and is linearly slidable in a length direction of the other body. Because of the sliding motion, at least a portion of the other body can be exposed and is accessible by the user.

However, the linear sliding motion of the related art slide type mobile communication terminals are rather limited and therefore provide a monotonous experience for a user of the related art mobile communication terminals. In addition, the monotonous sliding path may interfere with developing new usable portions of the moveable bodies.

BRIEF SUMMARY OF THE INVENTION

Therefore, an object of the present invention is to provide a slide type mobile communication terminal having a body capable of being slid along both a lateral and longitudinal direction with respect to another body of the mobile communication terminal.

To achieve these and other advantages and in accordance with the purpose of the present invention, as embodied and broadly described herein, there is provided a mobile communication terminal including a first body, a second body slidably connected to the first body and moveable between a first position and a second position, and a slide module connecting the first body to the second body. The slide module is configured to guide the second body along a curved path between the first position and the second position such that the second body moves in both a lateral and longitudinal direction with respect to the first body.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 8 through 10 are schematic views illustrating operation states of a mobile communication terminal having a supporting link thereof in accordance with another modification of the first embodiment of the present invention, wherein FIG. 8 shows an exemplary case where the terminal is moved to a closed position, FIG. 9 shows an exemplary case where the terminal is moved to a middle position, and FIG. 10 shows an exemplary case where the terminal is moved to an opened position;

DETAILED DESCRIPTION OF THE INVENTION

Description will now be given in detail of a mobile communication terminal according to the present invention, with reference to the accompanying drawings. The mobile communication terminal may include a wireless communication module (not shown) to perform a wireless communication function, or the like.

Figure 1:
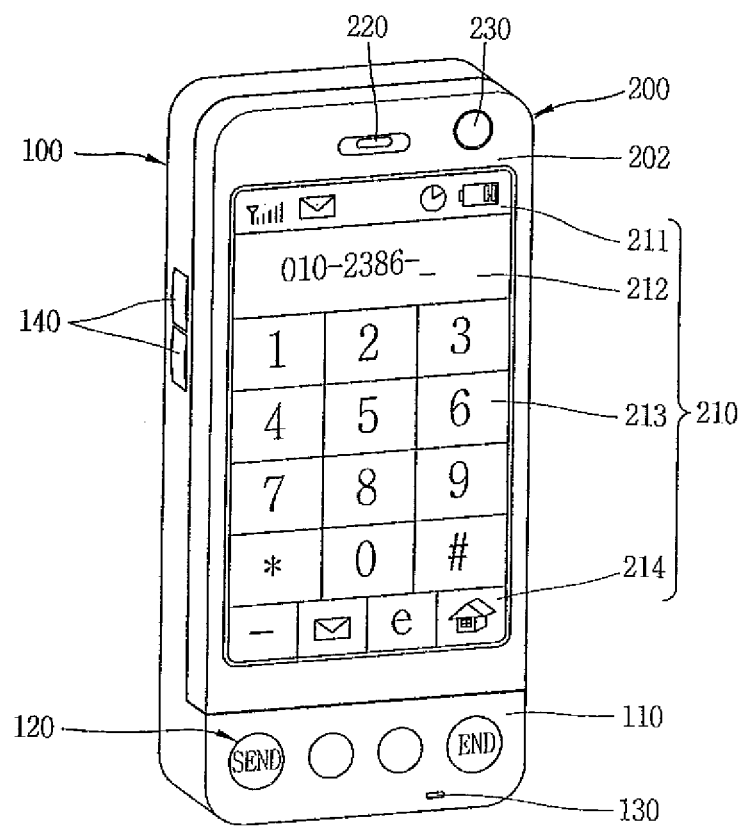
FIG. 1 is a front perspective view of a mobile communication terminal in accordance with one embodiment of the present invention.

As shown in FIG. 1, a main body of the mobile communication terminal includes a first body 100, and a second body 200 stacked on the first body 100 in a closed position thereof FIGS. to cover a portion of the first body 100. The second body 200 has an area smaller than that of the first body 100. In this arrangement, a portion of the first body 100 without the second body 200 stacked thereon is referred to as an exposed portion 110. The exposed portion 110 is protruded from one portion of the first body 100 to have the same height as that of an outer surface 202 of the second body 200. Alternatively, the first and second bodies 100 and 200 may have substantially the same area, thereby eliminating the exposed portion 110.

At least one key button 120 operable in a pushing manner is arranged at the exposed portion 110. For example, a plurality of functional keys for signal input such as SEND, END and the like may be provided as the key buttons 120. A microphone 130 is disposed near one of the key buttons 120. At least one side button 140 is disposed on a surface adjacent to the surface having the microphone 130 disposed thereon, namely, on a side surface of the first body 100. The side button 140 may be used to control volume or the like.

A display 210 is disposed at the outer surface 202 of the second body 200. The display 210 displays visual information and a user can touch the display 210 to input information. In this instance, the display 210 includes a touch-sensitive input unit. As shown in FIG. 1, the display is used to make a phone call. In this mode, the touch screen 210 displays an indicating region 211 for providing various information regarding the status of the mobile communication terminal, a number display region 212 for displaying a phone number which a user desires to dial (originate), a button input region 213 for displaying numeral icons to input the phone number, and a menu display region 214 for displaying several menus or menu icons. A receiver 220 is arranged near the touch screen 210.

In a stand-by state, the display 210 may be locked in a deactivated state. In order to release the locked state of the display 210, the user can press any one of the key buttons 120 so as to activate the display 210. After the activation of the display 210, the user can input a phone number of a called party by touching numeral icons displayed on the display 210 and press a SEND button of the key buttons 120 so as to be connected to the called party. In the connected state, the user can send his voice through the microphone 130 and receive voice of the called party through the receiver 220.

In addition, the user can execute repeatedly-used functions by pressing the key button 120. Accordingly, a slow response that may occur when the touch screen 210 is touched can be compensated by using the key button 120. Also, various types of characters or images can be inputted on the touch screen 210 using a stylus (not shown).

Figure 2:
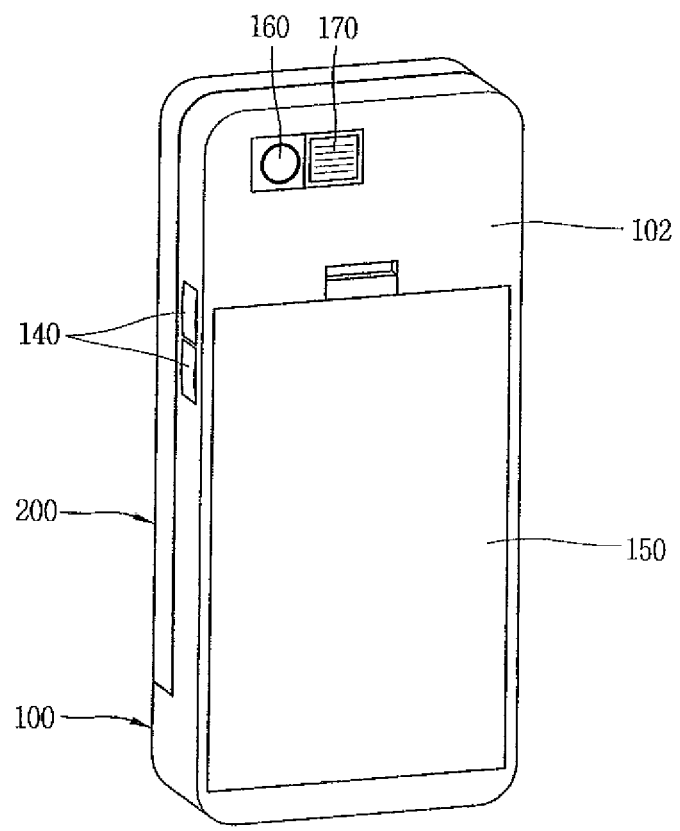
FIG. 2 is a rear perspective view of the mobile communication terminal of FIG. 1.

As shown in FIG. 2, a battery 150 for supplying power to each electric component of the main body is detachably coupled to a rear surface or an outer surface 102 of the first body 100. A first camera 160 and a flash 170 are located at a portion of the outer surface 102 where the battery 150 does not occupy. The first camera 160 can be operated by one of the key button 120 or the side button 140 to capture images. The images captured by the first camera 160 are displayed on the display 210. If a mirror is disposed close to the first camera 160, the user can capture his own image while looking in the mirror.

Figure 3:
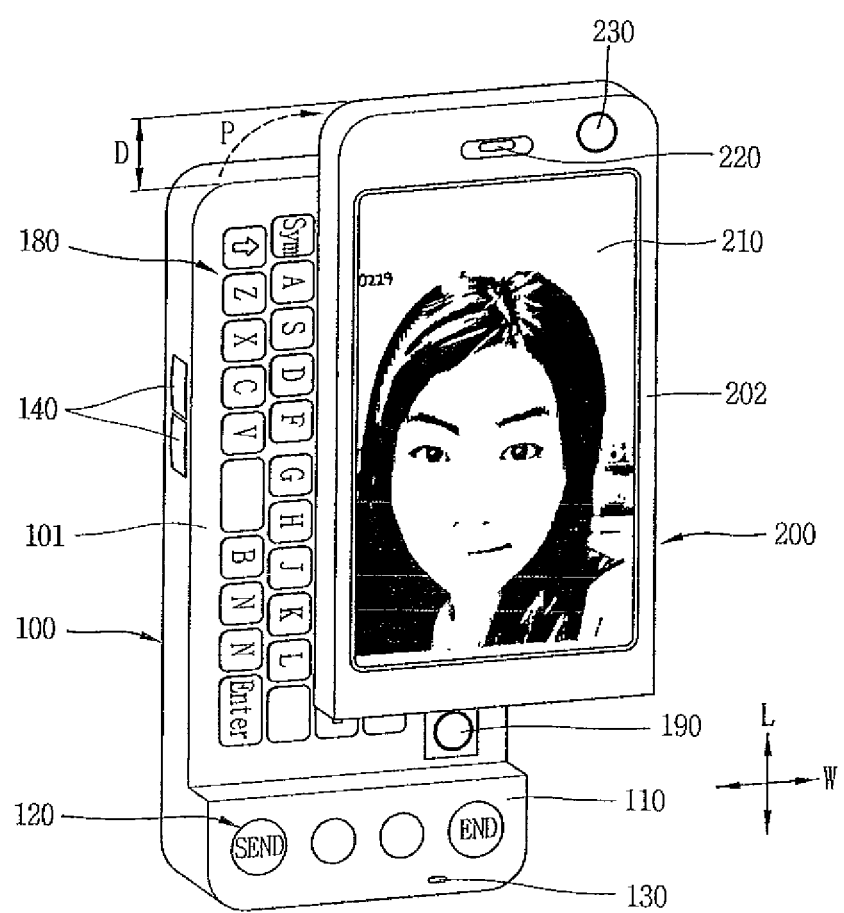
FIG. 3 is a front perspective view of a second body of the mobile communication terminal of FIG. 1 moved by a certain level in a width direction thereof.
Figure 4:
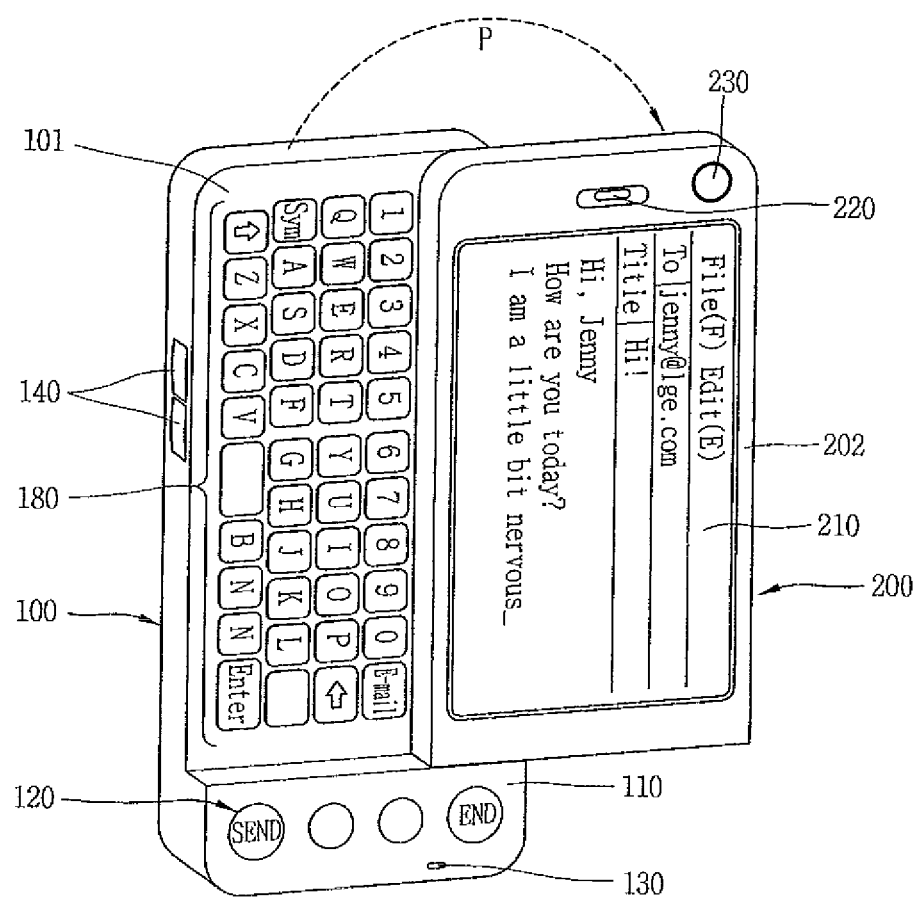
FIG. 4 is a front perspective view of the second body of FIG. 3 completely moved in the width direction thereof.

With reference to FIGS. 1, 3 and 4, when the user pushes the second body 200 in the width direction W thereof, the second body 200 is not moved along a linear path in the width direction W, but slides along a curved path, for example, a semi-circular path P. In other words, the second body 200 is moved to a completely opened position in the width direction W (see FIG. 4) by following a curved path that includes movement in both a lateral or width direction W and a length or longitudinal direction L. During the movement, the second body 200 is first moved to an intermediate position (see FIG. 3) apart from the exposed portion 110 by a certain distance D in its length direction L. If the exposed portion 110 of the first body 100 and the outer surface 202 are coplanar, the second body may movie in a plane such that the exposed portion 110 and the outer surface 202 remain parallel.

As shown in FIG. 3, the second body 200 can be moved to or positioned at an intermediate position where the second body has moved the furthest from the exposed portion 110 in the length direction L thereof. The second body 200 can be temporarily stopped at that position. In addition, a sensor, such as a magnetic sensor (not shown), can be used to sense the state that the second body 200 is positioned at the intermediate position. When the second body 200 is at the intermediate position, a second camera 190 mounted at an exposed portion of an inner surface 101 of the first body 100 is visible. The second camera 190 may have a capturing direction almost opposite to that of the first camera 160. By operating the key button 120 while the second camera 190 faces the user, the user can easily capture his own image while viewing his face displayed on the display 210. In this configuration, the second camera 190 can be disposed in a normally covered region when the second body 200 is in the completely opened position, as shown in FIG. 4. The portion having the second camera 190 becomes a usable region as the second body 200 is slid along a semi-circular path P.

When the second body 200 is at the intermediate position, a controlling unit (not shown) of the mobile terminal can activate the second camera 190 and the display 210. Accordingly, the user can perform an image capturing (e.g., self-capturing) with the second camera 190 when the second body 200 is at the intermediate position.

To provide additional security, a sensor (not shown) for sensing or recognizing specific information related to the user, such as a user's fingerprint or his iris, may be disposed at the additionally usable region so as to release a locked state of the mobile terminal. Also, a key button for performing a particular function may be disposed at the usable region. The sensor or the key button as well as the second camera 190 are not always exposed, but are exposed when the terminal is at the intermediate position. Accordingly, the frequency of use thereof is preferably lower than that of the key button 120.

Because a user may desire to use a camera more frequently than the described sensor, a third camera 230 for self-image capturing may be disposed at the outer surface 202 of the second body 200. Here, the second or third camera 190 or 230 is preferably used for the self-image capturing. The second or third camera 190 or 230 preferably has a relatively low resolution as compared to that of the first camera (160 in FIG. 2), so as to minimize a data amount (e.g., a user's image captured by himself) to be sent for a video telephony. If desired, one of the second or third cameras 190 or 230 may be eliminated.

Still referring to FIG. 4, an input device 180, such as a keypad having a plurality of keys arranged thereon, is installed at the inner surface 101 of the first body 100. The inner surface 101 has a rectangular region extending in a length direction L thereof, such that the input device 180 is disposed in a QWERTY configuration. The input device 180 can be partially exposed at the intermediate position of the second body 200 and entirely exposed at the opened position of the second body 200, as shown in FIGS. 3 and 4. At the opened position, the user can easily input long text by operating the input device 180. Therefore, the user can easily use functions of the mobile terminal such as sending e-mails, text, or the like.

Hereinafter, with reference to FIGS. 5 to 24, explanation will be given of exemplary embodiments of a slide module for guiding the second body 200 along the curved path and additionally a sliding guide unit for assisting the sliding operation to provide a semi-automatic function. In the following embodiments, the same configuration as that shown in FIGS. 1 to 4 has the same reference numerals to thusly be understood by the description of the foregoing drawings.

Figure 5:
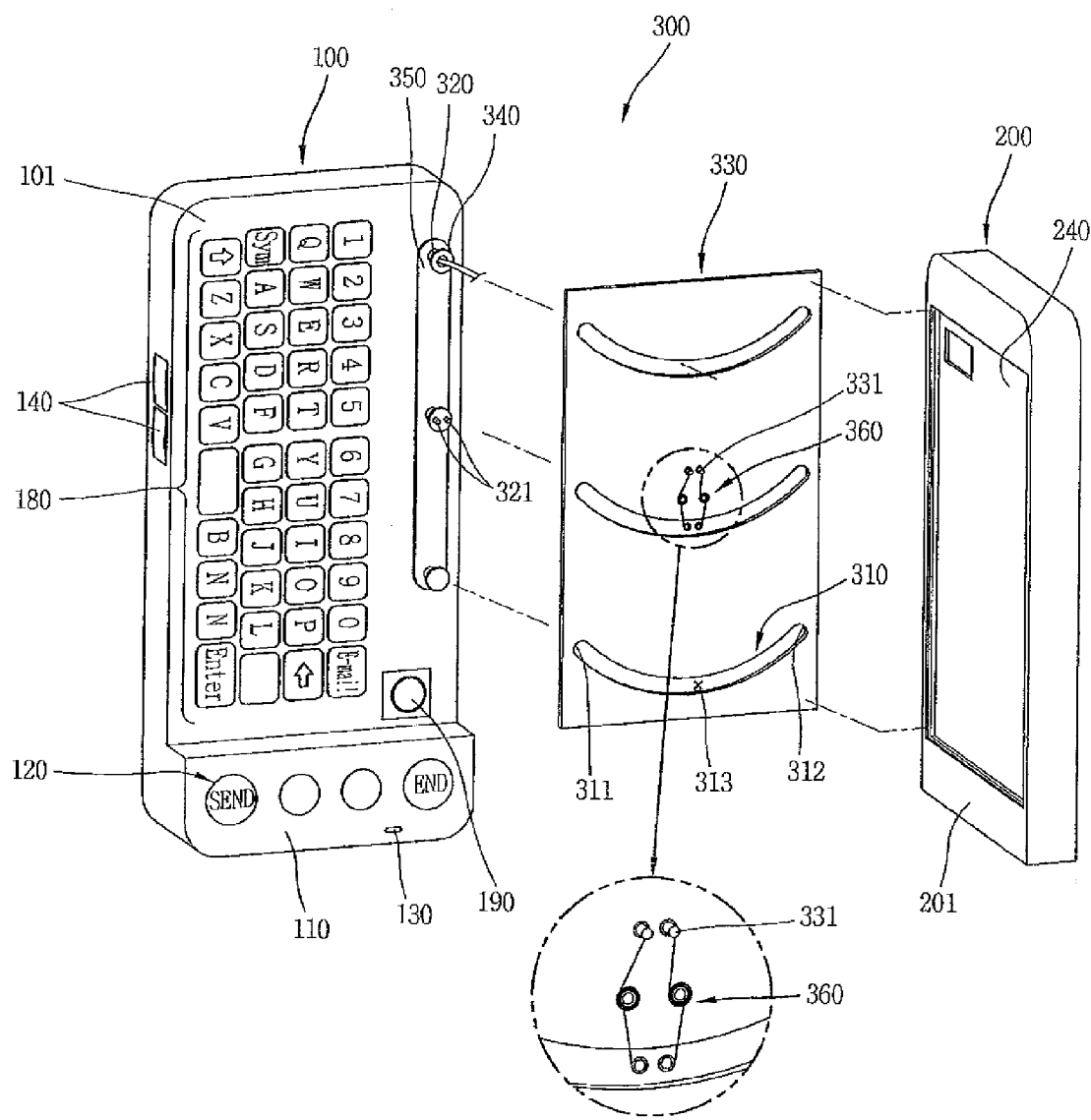
FIG. 5 is an exploded perspective view of a mobile communication terminal having a slide module in accordance with a first embodiment of the present invention.

As shown in FIG. 5, at an inner surface 201 of the second body 200 opposite the surface having the display 210, a recessed portion 240 having an approximately rectangular or square shape is formed. A plate-shaped guide plate 330 of a slide module 300 is mounted in the recessed portion 240 in a bonding manner, screw-coupling manner, or the like. At least one guide rail 310 is formed in the guide plate 330 and may have a semi-circular shape. The central portion 313 of the guide rail 310 may be located closer to the exposed portion 110 than both end portions 311 and 312.

In correspondence with the guide rail 310, the slide module 300 has at least one guide protrusion 320 protruded from one side of the first body 100. An anti-separation unit 340 is installed at a free end of the guide protrusion 320. The anti-separation unit 340 has an area larger than the width of the guide rail 310 to prevent the guide protrusion 320 from being separated from the guide rail 310. The anti-separation unit 340 can be assembled to the guide protrusion 320 in a state that the guide protrusion 320 is first inserted in the guide rail 310. The guide protrusion(s) 320 may be attached to or integrally formed on a guide frame. Accordingly, when the guide frame 350 is coupled to the first body 100, the guide protrusion(s) 320 are also coupled to the first body 100.

A sliding guide unit, which may be an elastic member 360, may additionally be disposed at the guide plate 330. At least one elastic member 360 capable of providing an elastic force can be provided where one end portion of the elastic member 360 is coupled to a fixing protrusion 331 protruded from one surface of the guide plate 330. In the embodiment shown in FIG. 5, a pair of elastic members 360 is provided to be symmetric with respect to each other. Each of the other end portions of the elastic member 360 is coupled to a fixing protrusion 321 formed at the free end of a corresponding guide protrusion 320. The elastic member 360 may be a wire-type spring and have a shape with a coil wound at least one time.

In this embodiment, when the second body 200 is at the closed position (see FIG. 1), the guide protrusion 320 is positioned at a second end portion 312 of the guide rail 310. Preferably, the elastic member 360 is maintained in a relaxed state at this position. When the second body 200 is moved to the intermediate position (see FIG. 3), the guide protrusion 320 is positioned at the central portion 313 of the guide rail 310. Consequently, the elastic member 360 is extended as the fixing protrusions 321 and 331 are apart from each other, thereby accumulating an elastic force.

When further force is applied until the second body 200 is moved over the intermediate position, the elastic force accumulated in the elastic member 360 is released, such that the second body 200 can be automatically moved to the opened position (see FIG. 4). Accordingly, the guide protrusion 320 is positioned at a first end portion 311 of the guide rail 310. The elastic member 360 is then restored to the original state similar to when the second body 200 was in the closed position.

Because the guide rail 310 of the slide module 300 forms a semi-circular path, the second body 200 is slid from the closed position to the opened position via the intermediate position, so as to follow the semi-circular path P. Also, the elastic member 360 allows the semi-automatic sliding motion in moving the second body past the intermediate position to the opened position. The sliding from the opened position is reversed to that described above.

To allow the second body 200 to be temporarily stopped at the intermediate position, the sliding guide unit 360 may be eliminated. Alternatively, even when the elastic member 360 is used, the guide rail 310 can be configured such that the central portion 313 becomes relatively narrow compared to the end portions 311 and 312 and the guide protrusion 320 is hindered at that portion. Accordingly, the second body 200 can be temporarily stopped at the intermediate position.

As described above, the guide rail 310 is formed at the separately provided guide plate 330. However, the guide rail 310 may be formed directly on the second body 200. In particular, when the second body 200 has a shape obtained by connecting two covers to each other, the guide rail 310 may be formed at the cover facing the first body 100. In addition, the guide protrusion 320 may be formed directly on the first body 100 or assembled thereto without the guide frame 350 therebetween.

However, by separately forming the guide plate 330 and the guide frame 350, the slide module (and the sliding guide unit) can be modularized so as to be separately manufactured or assembled. Also, after assembling the modularized slide module 300, it can be assembled to each of the first and second bodies 100 and 200, thereby providing a simple assembly process.

Figure 6:
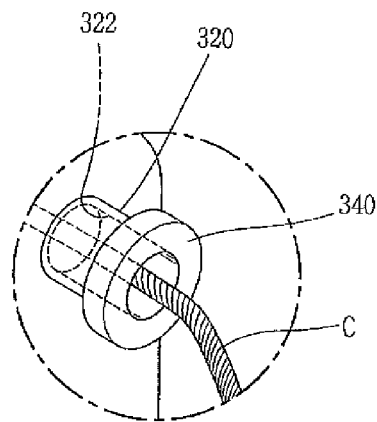
FIG. 6 is a partial perspective view of a cable extends through a guide protrusion of FIG. 5.

As shown in FIG. 6, the guide protrusion 320 and the anti-separation unit 340 are connected to each other so as to form a hollow channel 322 therethrough. A cable C for electrically connecting the first body 100 to the second body 200 extends through the hollow channel 322. The cable C can be any type of cable for electrically connecting the first body to the second body, such as FPCB (Flexible Printed Circuit Board) or Coaxial Cable if it is a medium allowing current flow. As a result, even when the second body 200 is slid with respect to the first body 100, the electric connection between the first and second bodies 100 and 200 can be stably maintained by the cable C.

Figure 7:
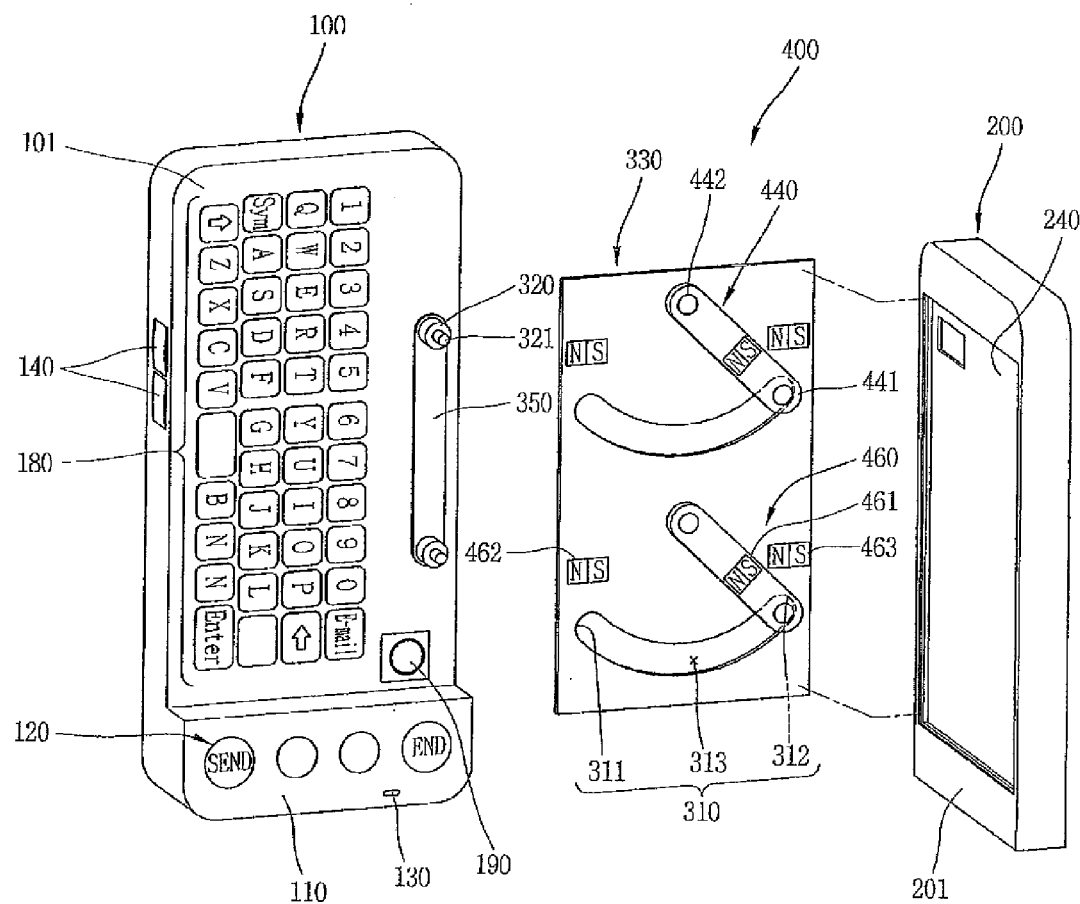
FIG. 7 is an exploded perspective view of a mobile communication terminal having a slide module and a sliding guide unit in accordance with a modification of the first embodiment of the present invention.

As shown in FIG. 7, the slide module 400, unlike in the aforementioned embodiment, includes a rotating link 440. A first end portion 441 of the rotating link 400 is rotatably coupled to the fixing protrusion 321 formed at the free end of the guide protrusion 320. A second end portion 442 of the rotating link 440 is rotatably coupled to the guide plate 330. The rotating link 440 can prevent the guide protrusion 320 from being separated from the guide rail 310, similar to that of the anti-separation unit 340 in the aforementioned embodiment, and the rotating link 440 can maintain a stable connection between the guide protrusion 320 and the guide rail 310.

In this exemplary embodiment, the sliding guide unit 460 includes a plurality of magnets disposed at the rotating link 440 and the guide plate 330. The sliding guide unit 460 includes a main magnet 461 arranged at the rotating link 440 and end magnets 462 and 463 arranged on the guide plate 330, the end magnets 462 and 463 being located close to respective end portions 311 and 312 of the guide rail 310.

In this configuration, the movement of the second body 200 along path P with respect to the first body is the same as described above. However, regarding the semi-automatic sliding aspect, when the first end portion 441 of the rotating link 440 is moved to either end portions 311 and 312 via the central portion 313 of the guide rail 310, the corresponding end magnet 462 and 463 generates an attractive force with respect to the main magnet 461. Accordingly, as the rotating link 440 moves towards one of the end portions 311 and 312 of the guide rail 310, the rotating link 440 can automatically be rotated by the magnetic force towards that end portion.

While the rotating link 440 is shown as being attached to the guide plate 330, the rotating link 440 can also be mounted at the second body 200. In addition, the guide plate 330 and the guide frame 350 can be separately provided to allow for modularization of the slide module 400 and the sliding guide unit 460. Furthermore, a new embodiment can be provided in which the previous embodiment can be combined with the modification of implementing the sliding guide unit using the magnetic force. In this instance, the main magnet 461 may be mounted at the free end of the guide protrusion 320, and the end magnets 462 and 463 may be arranged at the end portions 311 and 312 of each guide rail 310.

Figure 8:
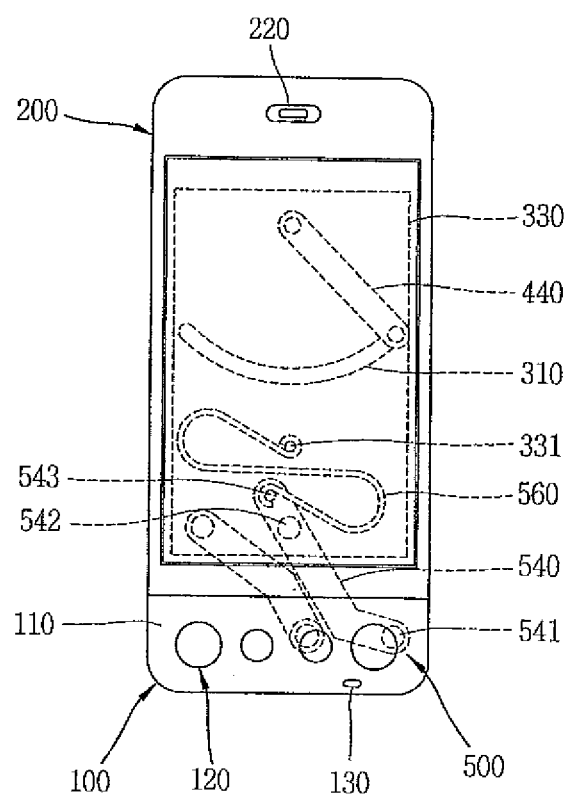

Another modification of the first embodiment of the present invention, as shown in FIG. 8, includes the rotating link 440 having one end connected to the guide protrusion 320 and the other end rotatably connected to the guide plate 330 near one end thereof. The guide rail 310 is formed at a portion of the guide plate 330 corresponding to the other end of the rotating link 440. At least one supporting link 540 having a portion 542 adjacent to one end portion 543 is rotatably connected at a portion of the guide plate 330 where the guide rail 310 and the rotating link 440 are not disposed. The other end portion 541 of the supporting link 540 is rotatably connected to the first body 100. The supporting link 540 may have a flat bar shape. In this arrangement, if the other end portion 541 is coupled to the lower side of the exposed portion 110, the other end portion 541 is not exposed outside the mobile terminal.

The one end portion 543 of the supporting link 540 is connected to one end portion of a sliding guide unit 560, such as an elastic member. The elastic member 560 may be a wire-shaped spring and have a curved shape to form an S-like shape. The other end portion of the elastic member 560 is coupled to the fixing protrusion 331 formed at the guide plate 330.

Figure 9:
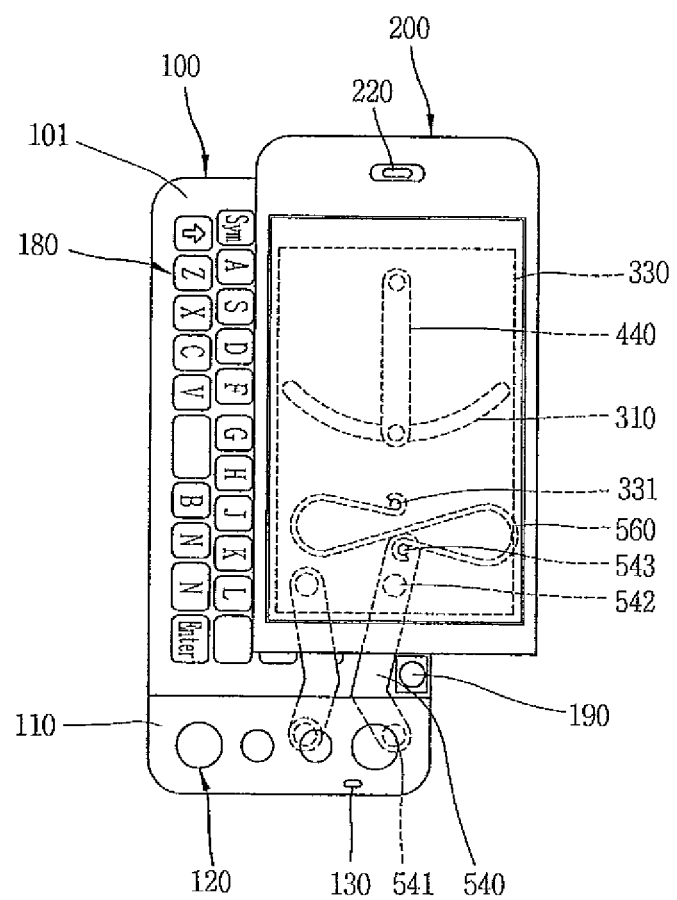

As shown in FIG. 9, when the second body 200 has been slid to the intermediate position, the rotating link 440 is substantially parallel to the length direction of the first body 100, and the supporting link 540 is approximately parallel to the rotating link 440. In this position, the supporting link 540 is partially exposed to the outside and the supporting link 540 does not block the second camera 190.

Figure 10:
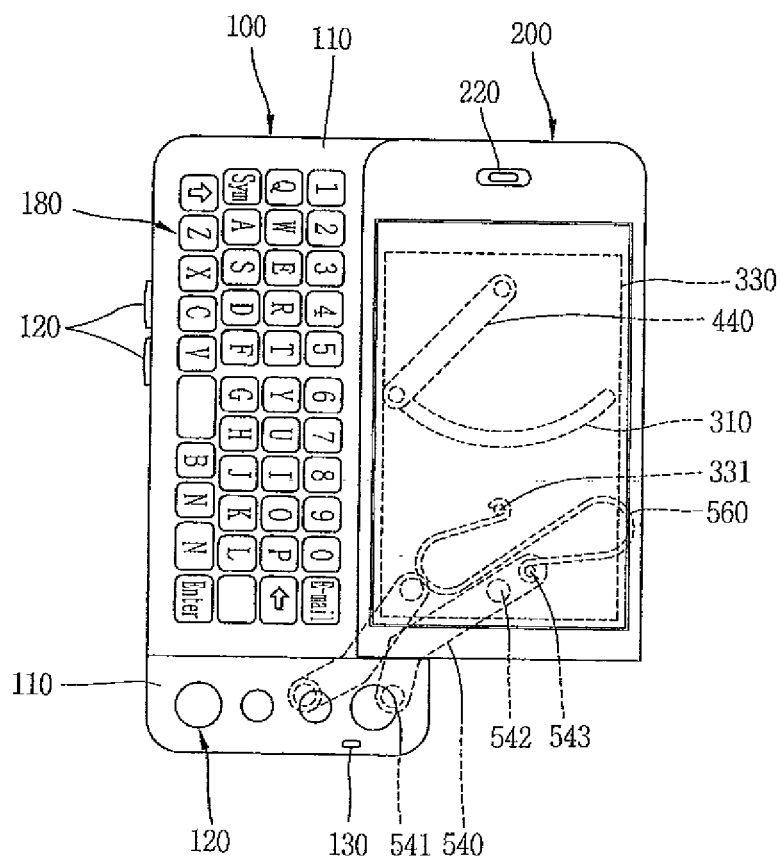

As shown in FIG. 10, when the second body 200 is placed in the opened position with respect to the first body 100, the rotating link 440 and the supporting link 540 are disposed to be inclined by approximately 45° with respect to the length direction of the first body 100. The elastic force accumulated by the change in the elastic member 560 during the process of moving from the closed position to the intermediate position is applied to the second body 200 to automatically slide to second body 200 to the opened position.

Figure 11:
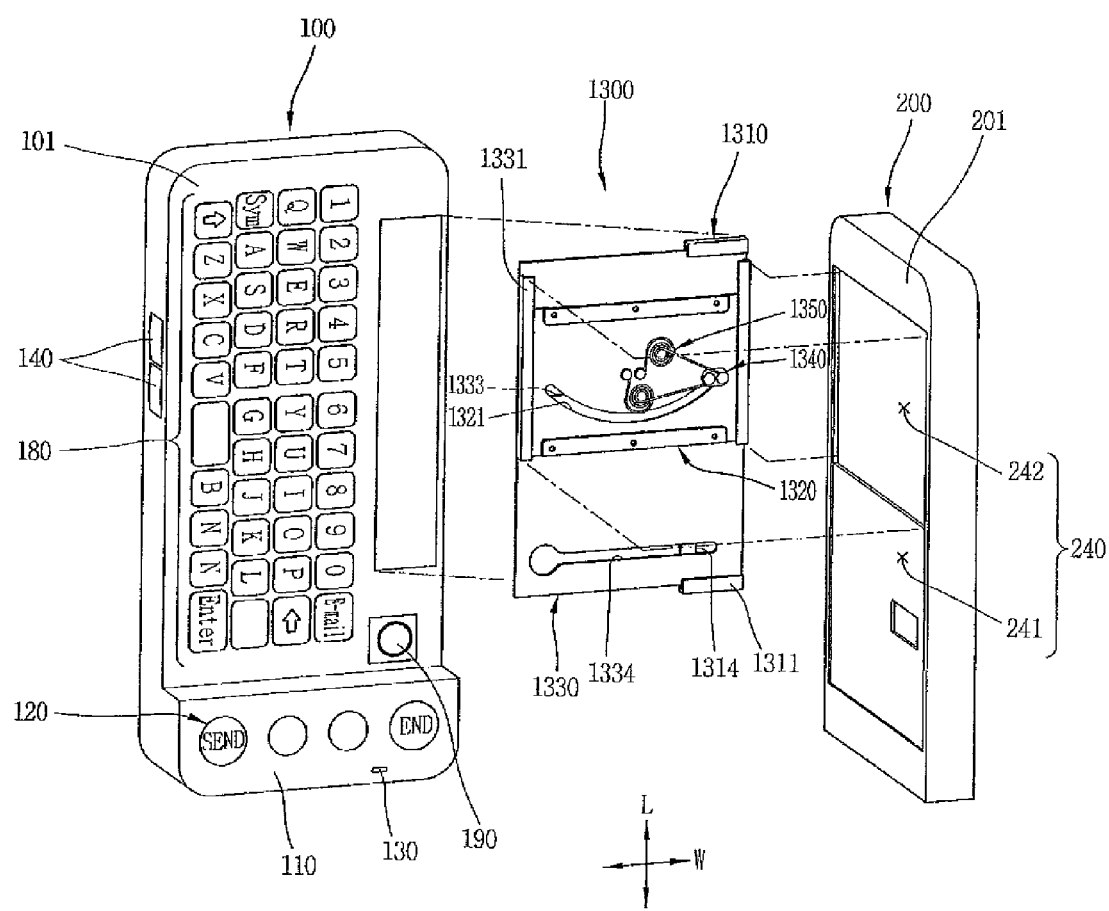
FIG. 11 is an exploded perspective view of an exemplary mobile communication terminal having a slide module in accordance with a second embodiment of the present invention.

FIG. 11 shows an exemplary mobile communication terminal having a slide module in accordance with a second embodiment of the present invention. In describing the second embodiment, where the slide module of the second exemplary embodiment is similar to that of the slide module according to the first exemplary embodiment, the same reference numerals will be used and detailed explanation of which will not be repeated.

As shown in FIG. 11, a recessed portion 240 is formed in the inner surface 201 of the second body 200. The recessed portion 240 may be divided into a first recessed portion 241 and a second recessed portion 242. The second recessed portion 242 is relatively more recessed with respect to the first recessed portion 241.

A second plate 1320 of the slide module 1300 is coupled to the recessed portion 240, particularly, the second recessed portion 242. The second plate 1320 is coupled to the inner surface 201 of the second body 200 defining the second recessed portion 242 in a bonding manner, a screw-coupling manner, or the like. In correspondence with the second plate 1320, a first plate 1310 is coupled to the first body 100. The first plate 1310 is formed to extend in a length direction L of the first body 100, and disposed at a portion at which the input device 180 is not installed.

Each of the first and second plates 1310 and 1320 is movably coupled to a third plate 1330. The first and second plates 1310 and 1320 may be slidably coupled corresponding opposing surfaces of the third plate 1330. The third plate 1330 can be slid with respect to the first plate 1310 in the width direction W. This sliding is guided by first guide rails 1311 formed at both end portions of the first plate 1310. The second plate 1320 is slid with respect to the third plate 1330 in the length direction L. This sliding is guided by second guide rails 1331 formed at opposing surfaces of the third plate 1330. The length of the third plate 1330 in the length direction L is shorter than that of the recessed portion 240. Accordingly, the third plate 1330 can be moved over a certain distance D (see FIG. 13A) in the length direction L inside the recessed portion 240.

Guide slots 1321 and 1333 are formed at corresponding positions on the second and third plates 1320 and 1330, respectively, to allow the second body 200 slide in the length direction L with respect to the force applied to the width direction W of the second body 200. A guide protrusion 1340 is protruded from the first plate 1310 and is inserted into the guide slots 1321 and 1333. The guide protrusion 1340 interacts with the guide slots 1321 and 1333 such that the second plate 1320 can be reciprocated in the length direction L with respect to the third plate 1330 when the third plate 1330 is slid with respect to the first plate 1310 in the width direction W. During the sliding motion, the cable (not shown) electrically connecting the first body 100 and the second body 200 extends through cable passages 1314 and 1334.

When the guide protrusion 1340 is moved to a central portion from one end portion of the guide slots 1321 and 1333, a sliding guide unit 1350 having one end connected to the second plate 1320 and the other end connected to the guide protrusion 1340 provides an elastic force to the guide protrusion 1340 such that the guide protrusion 1340 can be automatically moved to the other end portion of the guide slots 1321 and 1333. The sliding guide unit 1350 is an elastic member, which can be a spring or the like.

Figure 12:
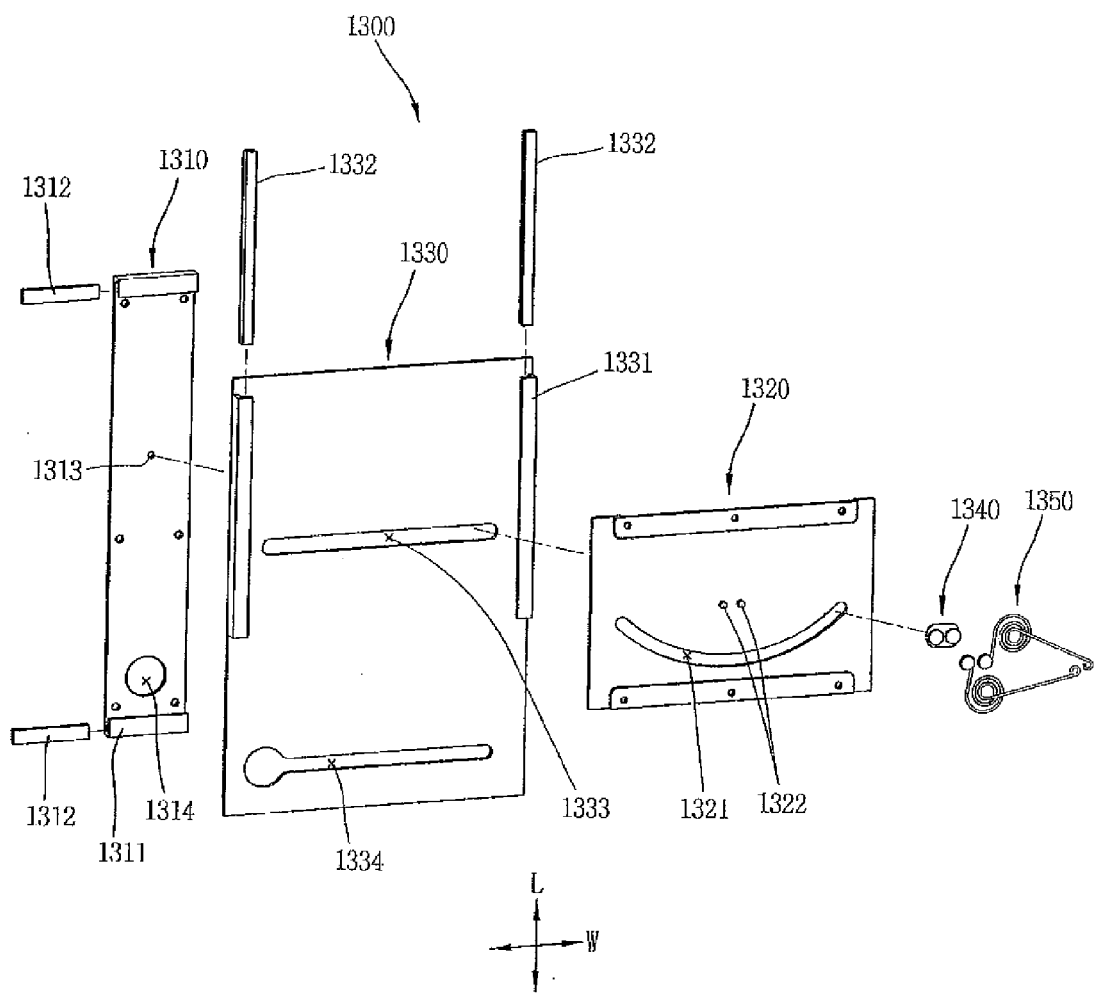
FIG. 12 is an exploded perspective view of the slide module of FIG. 11.
Figure 12A:
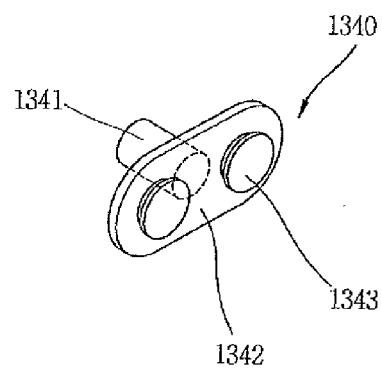
FIG. 12A is a detailed view of a component of slide module of FIG. 11.

As shown in FIG. 12, the first plate 1310 is longer in its length direction L as compared to its width direction W. End portions of the first plate 1310 are bent and slightly extended so as to form the first guide rails 1311. Both end portions of the length direction L of the third plate 1330 are movably inserted in the first guide rails 1311. A first lubricious member 1312 is inserted in each of the first guide rails 1311 to reduce friction when the guide rails 1311 come in contact with the third plate 1330. The first lubricious member 1312 may be an engineering plastic having good lubrication such as POM (Poly Oxy Methylene). The engineering plastic may be coupled to the first guide rail 1311 by an injection molding.

A coupling hole 1313 is formed at a central portion of the first plate 1310. One end portion of the guide protrusion 1340 is inserted into the coupling hole 1313 to be fixed thereto. In addition to the coupling hole 1313, cable passage 1314 in the form of a cable opening is also formed at the first plate 1310.

In correspondence to the guide protrusion 1340, the third plate 1330 includes the second guide slot 1333, which extends linearly along the width direction W of the third plate 1330. A cable passage 1334 in the form of a cable slot may also be formed along the width direction W at a portion close to one end portion of the third plate 1330, namely, at a portion not interfering with the second plate 1320.

The second guide rail 1331 for guiding the second plate 1320 along the length direction L is formed at both end portions of the width direction W of the third plate 1330. The second guide rail 1331 and the second lubricious member 1332 coupled thereto are similar to the first guide rail 1311 and the first lubricious member 1312 previously described. The first guide slot 1321 is formed at the second plate 1320. The first guide slot 1321 may be a slot which has both end portions approximately corresponding to those of the second guide slot 1333, but has a semi-circularly opened shape. Alternatively, the first guide slot 1321 may be formed at the third plate 1330 and the second guide slot 1333 may be formed at the second plate 1320.

Fixing portions 1322 protrude from the second plate 1320 and are coupled to one end of each of the elastic members 1350. The other ends of the elastic members 1350 are coupled to the fixing portions 1343 of the guide protrusion 1340, which is inserted into the guide slots 1321 and 1333. The guide protrusion 1340 includes a body 1341 inserted into the guide slots 1321 and 1333 and an anti-separation unit 1342 extending to be wider than the width of the guide slots 1321 and 1333 to prevent the guide protrusion 1340 from being separated from the guide slots 1321 and 1333. Therefore, the other ends of the elastic members 1350 may be coupled to the fixing portions 1343 protruded from the anti-separation unit 1342.

An operation method of the slide module 1300 will be described with reference to FIGS. 13 to 15 and FIGS. 1, 3, and 4.

Figure 13A:
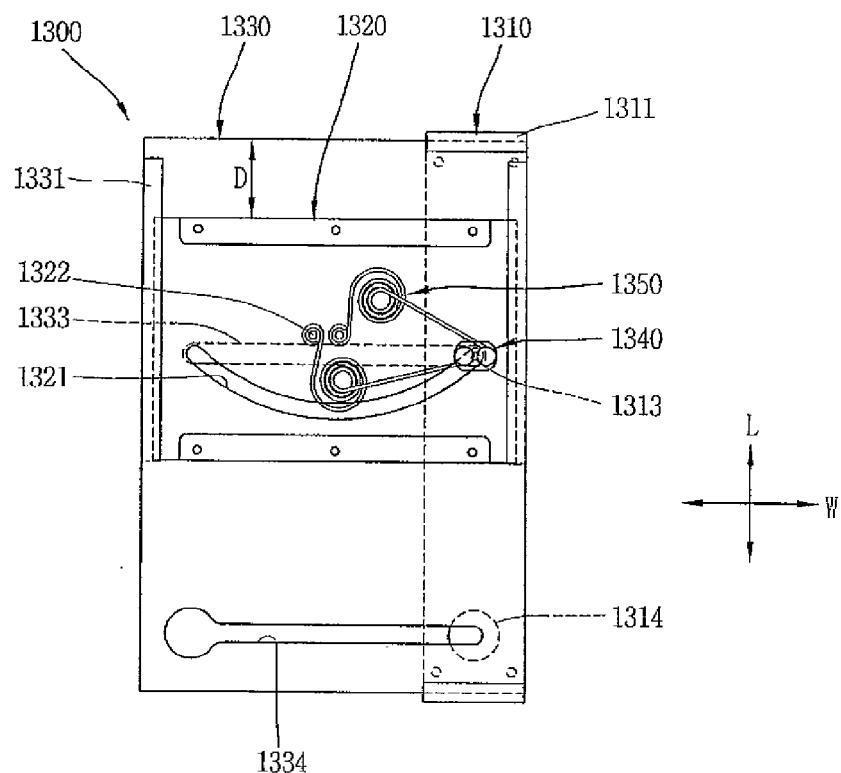
FIGS. 13A and 13B are front views and rear views, respectively of the slide module when the mobile communication terminal according to the second exemplary embodiment is at a closed position.
Figure 13B:
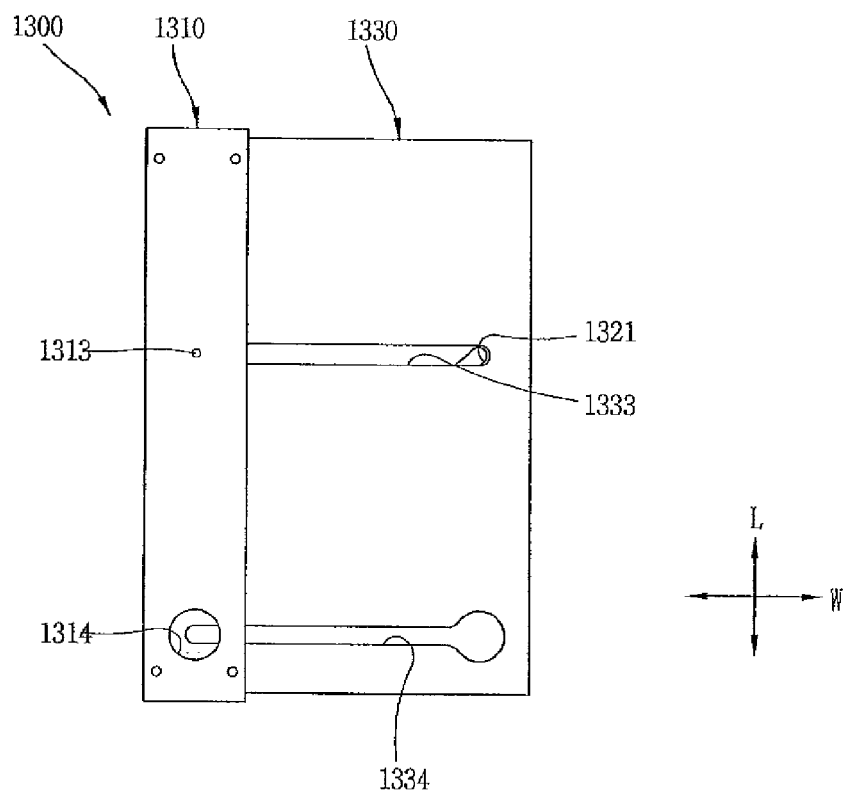

As shown in FIGS. 13A and 13B, at a closed position where the second body 200 completely overlays the first body 100 (see FIG. 1), one end portion of the third plate 1330 is arranged at a position at which one end portion of the first plate 1310 are almost aligned with each other at their width direction. The second plate 1320 is placed in a state of being apart from one end portion of the third plate 1330 by a certain distance D in the length direction L. One end portion of the first guide slot 1321 is aligned with one end portion of the second guide slot 1333. The guide protrusion 1340 extends through the aligned end portions. The elastic member 1350 having one end portion connected to the guide protrusion 11340 is in a relatively relaxed state. The cable passage 1314 is in communication with one end portion of the cable passage 1334. The cable (not shown) for electrically connecting the first body 100 and the second body 200 extends through the both cable passages 1314 and 1334.

Figure 14A:
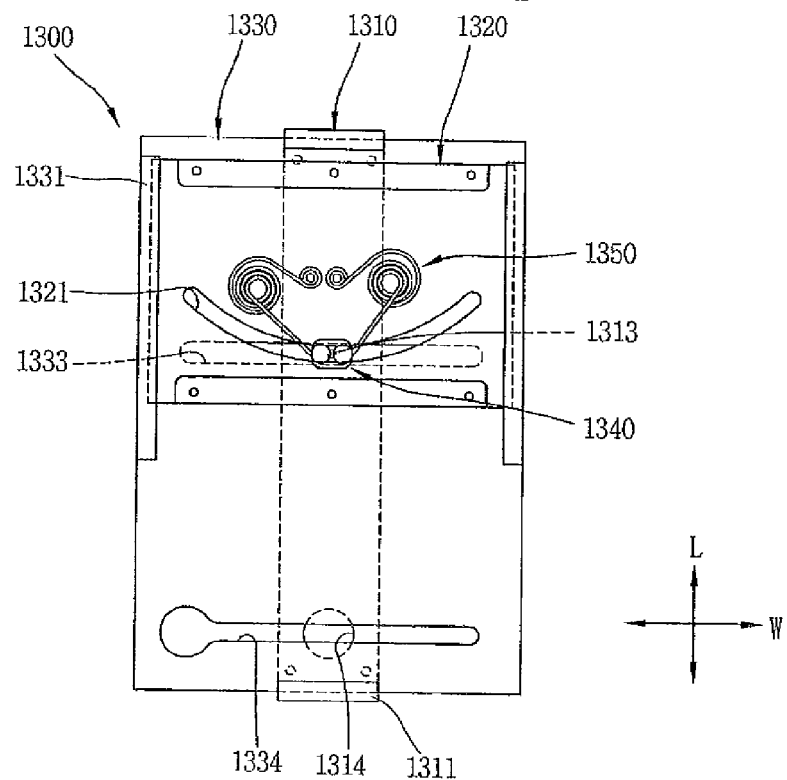
FIGS. 14A and 14B are front and rear views, respectively of the slide module when the mobile communication terminal according to the second exemplary embodiment is at an intermediate position.
Figure 14B:
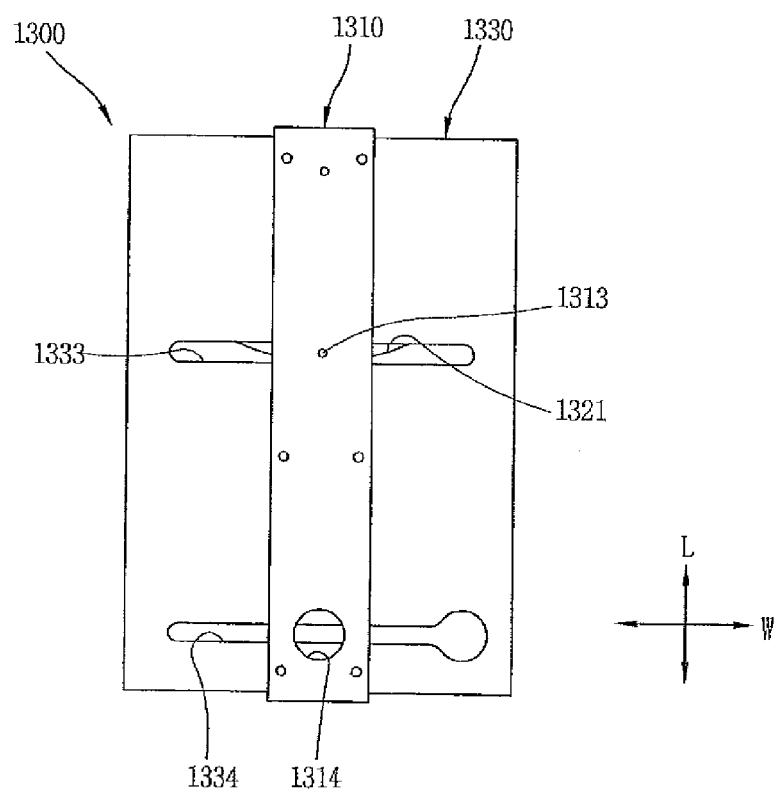

As shown in FIGS. 14A and 14B (and FIG. 3), the second body 200 is moveable to the intermediate position and is maximally displaceable by a certain distance D (see FIG. 13A) in the length direction L while being slid along the semi-circular path P in the width direction W. In order to move the second body 200 from the closed position to the intermediate position, the user pushes the second body 200 in the width direction W. Accordingly, the third plate 1330 performs a primary movement with respect to the first plate 1310 in the width direction W. During the primary movement, the guide protrusion 1340 is relatively moved along the second guide slot 1333 and simultaneously guided by the first guide slot 1321. As the guide protrusion 1340 is guided by the first guide slot 1321 forming the semi-circular path P, the second plate 1320 is moved in the length direction L to perform a secondary movement. Accordingly, the third plate 1330 is moved by a certain distance with respect to the first plate 1310 such that the first plate 1310 is positioned at a central portion of the third plate 1330. Simultaneously, the second plate 1320 is moved by a certain distance D with respect to the third plate 1330 in the length direction L to be almost near one end portion of the third plate 1330.

In moving from the closed position to the intermediate position, the elastic member 1350 is compressed because the guide protrusion 1340 is closer to the fitting portion 1322 on the second plate 132 than it is at the closed position. The cable (not shown) extends through the portion at which the central portion of the cable passage 1314 and the cable passage 1334 are communicated with each other. If the width of each of the guide slots 1321 and 1333 becomes narrower by configuring a protruded portion to interfere with the guide protrusion 1340 at the central portion of at least one of the first or second guide slot 1321 or 1333, the guide protrusion 1340 may be temporarily fixed to the central portion even if the elastic member 1350 is employed. Hence, the mobile communication terminal according to the present invention can be used for the self-image capturing in the state that the second body 200 is at the intermediate position (see FIG. 3).

Figure 15A:
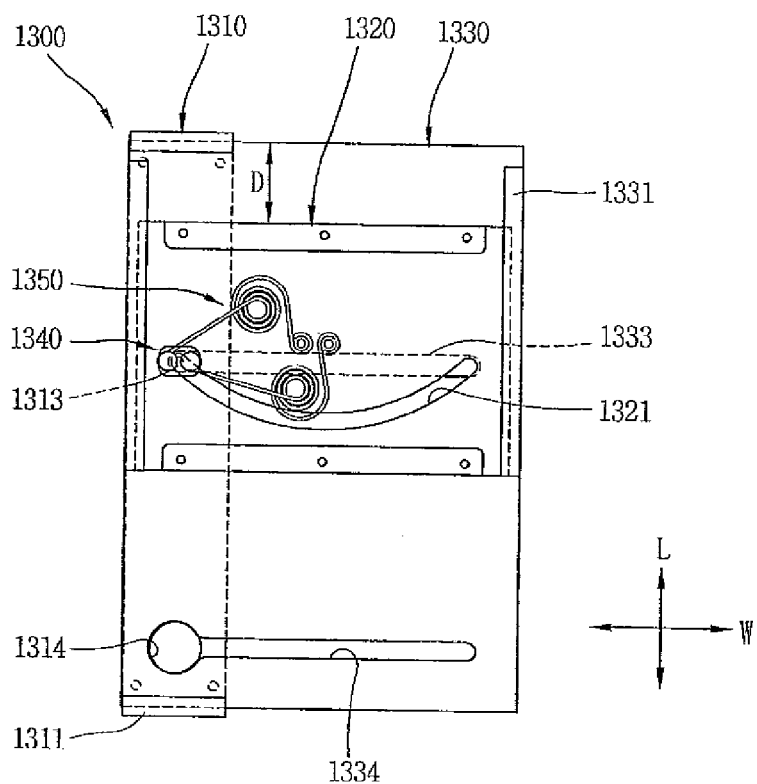
FIGS. 15A and 15B are front and rear views of the slide module when the mobile communication terminal according to the second exemplary embodiment is at an opened position.
Figure 15B:
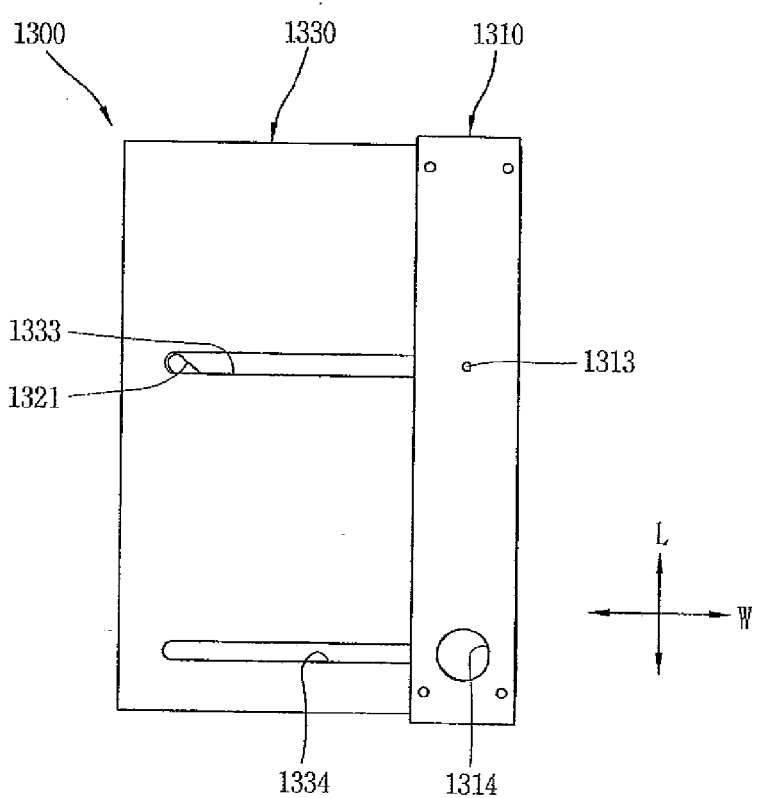

As shown in FIGS. 15A and 15B (and FIG. 4), the second body 200 is moveable to the opened position at which the input device 180 is completely exposed and the second body 200 is maximally slid along the semi-circular path P in the width direction W. While moving from the intermediate position to the opened position, as the third plate 1330 is slid with respect to the first plate 1310 in the width direction W, the first plate 1310 is almost aligned at the other end portion of the third plate 1330 in the width direction W. During the movement, the guide protrusion 1340 is moved toward a portion at which the other end portions of the first and second guide slots 1321 and 1333 are aligned with each other. As the other end portions of the first and second guide slots 1321 and 1333 are realigned with each other, the second plate 1320 is moved downwardly by a certain distance D to be apart from the one end portion of the third plate 1330.

The movement is automatically performed by the elastic force accumulated by the compression of the elastic member 1350 and the subsequent release of the compression. The cable (not shown) extends through the portion at which the other end portion of the cable passage 1334 and the cable passage 1314 are communicated with each other. To move the second body 200 back to the closed position overlaying the first body 100, the above process is reversed.

Figure 16:
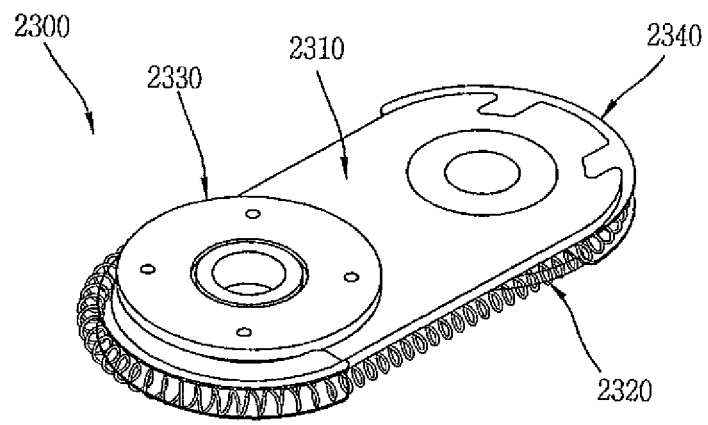
FIG. 16 is an assembled perspective view illustrating an exemplary slide module in accordance with a third embodiment of the present invention.
Figure 17:
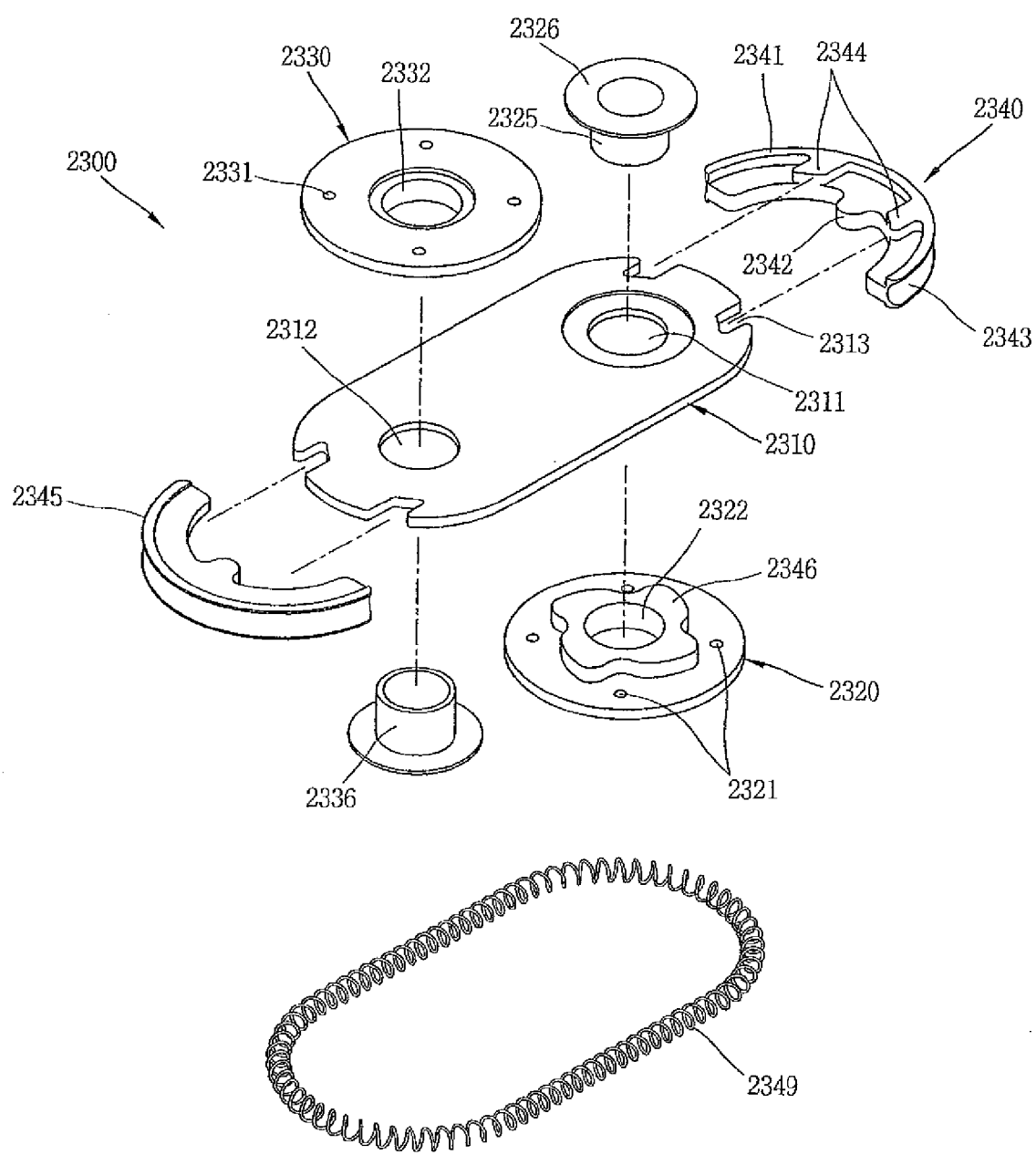
FIG. 17 is an exploded perspective view of the slide module in FIG. 16.
Figure 18:
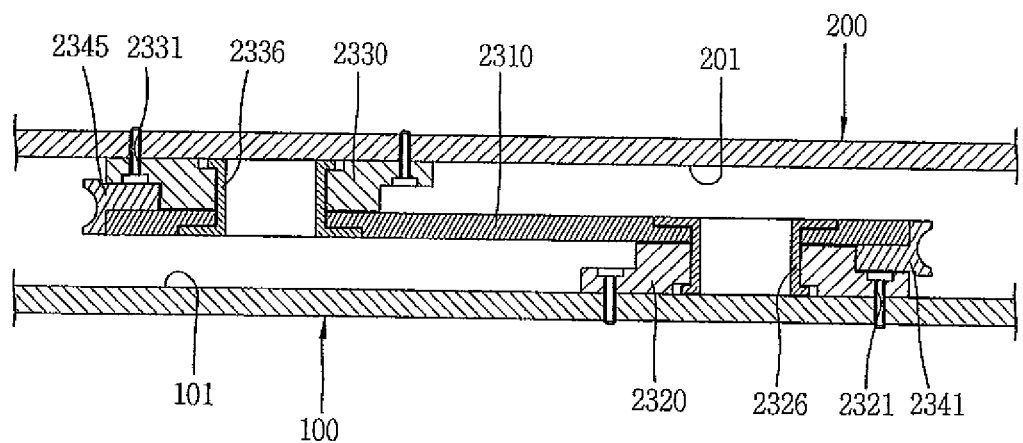
FIG. 18 is a sectional view schematically showing a mobile communication terminal having the slide mode in FIG. 16.

A third exemplary embodiment of the mobile communication device and slide module is shown in FIGS. 16-18. As shown in these figures, the slide module 2300 includes a rotation plate 2310 disposed between the first body 100 and the second body 200 to be rotatable within a certain range. The slide module 2300 includes a first roller 2320 rotatably supported by one end of the rotation plate 2310 and is fixed to the inner surface 101 of the first body 100, and a second roller 2330 rotatably supported by the other end of the rotation plate 2310 and is fixed to the inner surface 201 of the second body 200.

The rotation plate 2310 has a particular length and both end portions are formed in a semi-circular shape. At one end of the rotation plate 2310, a first hinge hole 2311 is located and the first roller 2320 is rotatably inserted therein. At the other end of the rotation plate 2320, a second hinge hole 2312 is located and the second roller 2330 is rotatably inserted therein.

The first roller 2320 is rotatably disposed at a lower surface of the rotation plate 2310. The first roller 2320 has a shape of a circular plate having a plurality of coupling holes 2321 formed in a circumferential direction so as to be fixable to the inner surface 101 of the first body 100. The first roller 2320 also has a circular opening 2322 at its central portion. The first roller 2320 is rotatably connected to the rotation plate 2310 by a first bushing 2325.

The first bushing 2325, which is cylindrical in shape, is fixed to the opening 2322 of the first roller 2320 and is rotatably supported by the first hinge hole 2311 of the rotation plate 2310 by a flange 2326. The flange 2326 contacts an upper surface of the rotation plate 2310 and is disposed at one end of the first bushing 2325. The other end of the first bushing 2325 is inserted into the opening 2322 of the first roller 2320 and then fixed onto the surface of the first roller 2320 by a riveting operation or the like, so as to avoid the separation of the first bushing 2325 from the first roller 2320. Alternatively, the other end of the first bushing 2325 can be inserted into the opening 2322 of the first roller 2320 to be fixed thereto by a nut, fixing ring, or the like.

The second roller 2330 includes a plurality of coupling holes 2331 located at the upper surface of the second roller 2330 in a circumferential direction to be fixable to the inner surface 201 of the second body 200. The second roller also includes an opening 2332 located at a central portion thereof. The second roller 2330 and the rotation plate 2310 are rotatably connected to each other by a second bushing 2336. The second bushing 2336, which is cylindrical in shape, is rotatably inserted into the second hinge hole 2312 of the rotation plate 2310 to thusly be inserted into the opening 2332 of the second roller 2330. The second bushing 2336 may have the same structure as that of the first bushing 2325 and disposed between the second roller 2330 and the rotation plate 2310 in the same manner.

A cable (not shown), such as FPCB or the like, for electrically connecting the first body 100 to the second body 200 extends out of the first body 100 along the surface of the rotation plate 2310 via the first bushing 2325. The cable is then passed through the second bushing 2336 to be connected to the second body 200.

According to this configuration, when applying a force onto the second body 200, the rotation plate 2310 is relatively rotated with respect to the second body 200 around the second roller 2330, and simultaneously rotated with respect to the first body 100 around the first roller 2320. By virtue of the motion of this slide module 2300, the second body 200 can perform the relative motion so as to be rotated with respect to the first body 100 along a semi-circular path P (see FIGS. 3 and 4).

Figure 19:
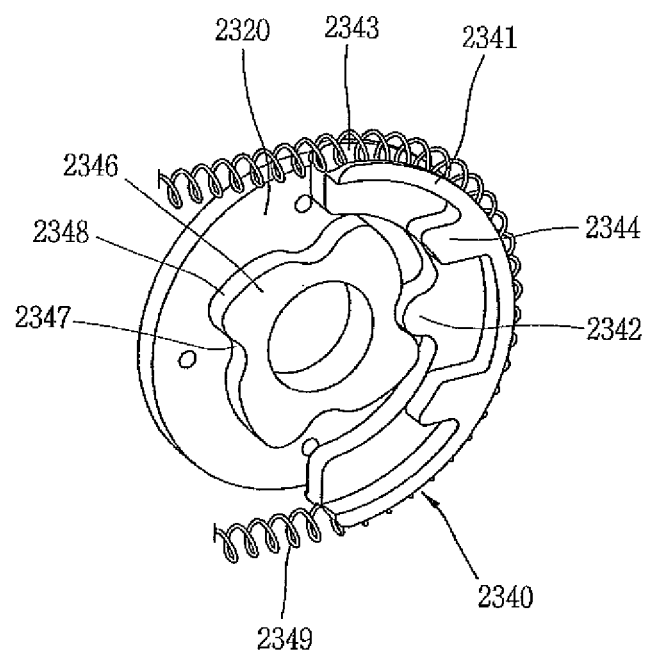
FIG. 19 is a perspective view of main parts of the sliding guide unit of FIG. 17.

The slide module 2300 according to the third embodiment of the present invention further includes a sliding guide unit 2340 for guiding the second body 200 to be semi-automatically slid by the relative rotation thereof. As shown in FIGS. 17 to 19, the sliding guide unit 2340 is interposed between the rotation plate 2310 and the first and second rollers 2320 and 2330. When the second body is in the intermediate position, the rotation plate 2310 can be automatically rotated through the remaining angle with assistance of the sliding guide unit 2340. The sliding guide unit 2340 also provides an elastic force such that the rotation plate 2310 can be held in the stopped state.

The sliding guide unit 2340 includes first and second cam members 2341 and 2345 positioned at both edges of the rotation plate 2310 to be linearly moveable in the length direction of the rotation plate 2310. A cam surface 2346 is formed at each of the first and second rollers 2320 and 2330 to come in contact with the first and second cam members 2341 and 2345. An elastic member 2349 is wound around the first and second cam members 2341 and 2345 so as to supply an elastic force to the first and second cam members 2341 and 2345.

The first cam member 2341 is formed in the shape of a semi-circular ring and is inserted into an outer circumference of the first roller 2320. A groove 2343, around which the elastic member 2349 is wound, is formed at the outer circumference of the first roller 2320. A cam protrusion 2342 configured to be in contact with the cam surface 2346 protrudes from a central portion of the first cam member 2341. The second cam member 2345 is formed similar to the first cam member 2341.

Supporting portions in the form of supporting grooves 2313 and supporting rods 2344 are formed between each of the first and second cam members 2341 and 2345 and the rotation plate 2310 such that the first and second cam members 2341 and 2345 are supported at the rotation plate 2310 to be linearly moveable with respect thereto. The supporting rods 2344 protrude inwardly from an inner surface of each of the cam members 2341 and 2345 and the supporting grooves 2313 are formed at the ends of the rotation plate 2310 such that the supporting rods 2344 can be inserted therein to be linearly moveable. The supporting rods 2344 of each of the cam members 2341 and 2345 are inserted into the supporting grooves 2313 of the rotation plate 2310 such that the cam members 2341 and 2345 can be integrally rotated with the rotation plate 2310 and the cam members 2341 and 2345 are linearly moved in the length direction of the rotation plate 2310.

Each of the cam surfaces 2346 has a curved surface alternately having a concave part 2347 and a convex part 2348 in the circumferential direction. Accordingly, the cam protrusion 2342 of each of the cam members 2341 and 2345 is moved while being in contact with the concave and convex parts 2347 and 2348. Specifically, the cam protrusion 2342 is in contact with the convex part 2348, the cam protrusion 2342 is moved by the elastic force from the elastic member 2349 to be in contact with the concave part 2347. As a result, the rotation plate 2310 can be automatically rotated by a certain angle around the rollers 2320 and 2330.

The elastic member 2349, which may be a ring-shaped coil spring, is wound around the first cam member 2341 and the second cam member 2345 to apply the elastic force in a direction that the distance between the first and second cam members 2341 and 2345 becomes narrower. In addition to the ring-shaped coil spring, the elastic member 2349 can be implemented as other types such as a rubber spring and the like.

Figure 20:
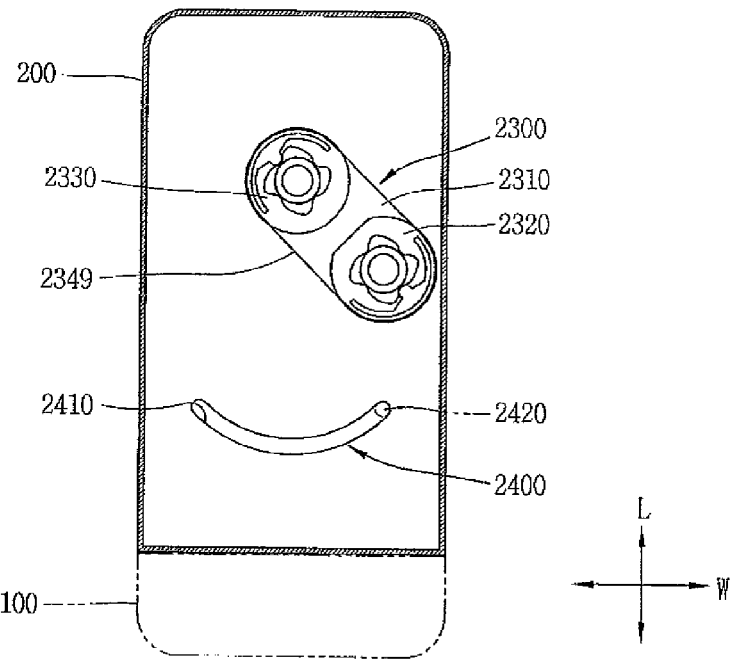
FIGS. 20 through 22 are schematic views showing operation states of a slide module in accordance with a third embodiment of the present invention.
Figure 21:
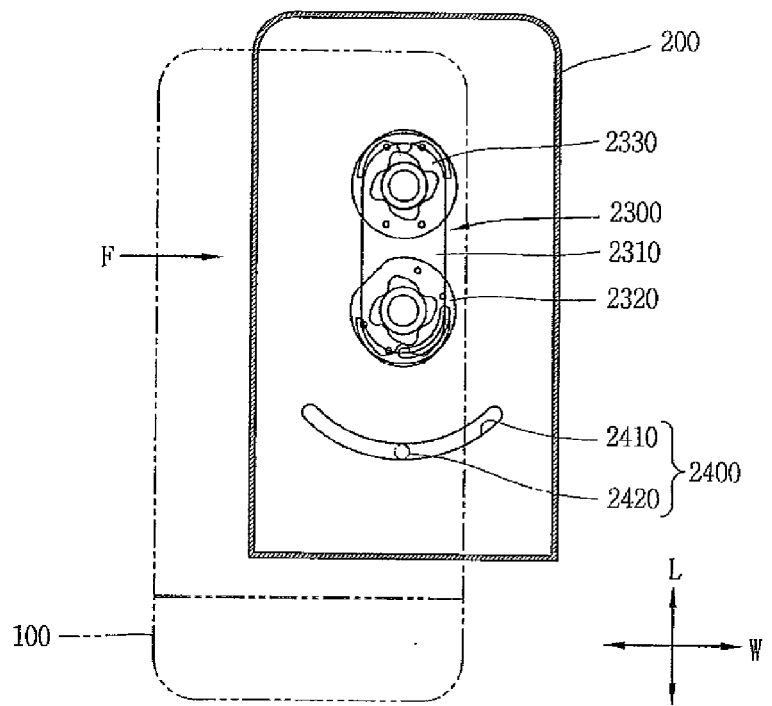
Figure 22:
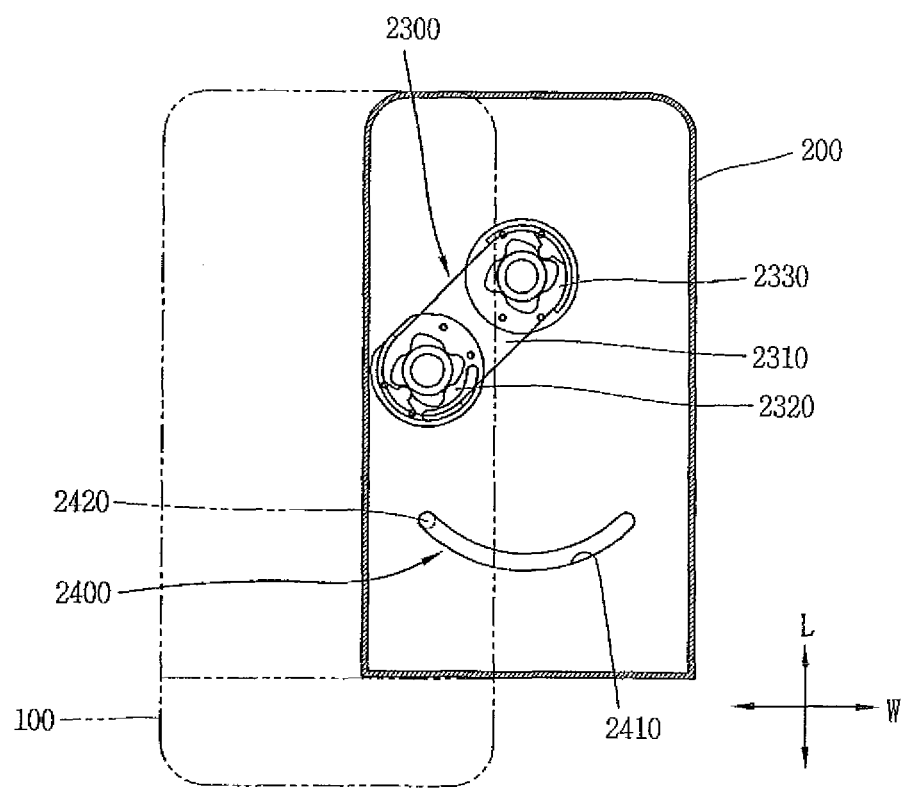

As shown in FIGS. 20 to 22, the mobile communication terminal includes a guide unit 2400. The guide unit 2400 includes a guide slot 2410 disposed at the inner surface 101 of the first body 100 to have an arc shape in the width direction of the first body 100, and a guide protrusion 2420 protruded from the inner surface 201 of the second body 200 and inserted into the guide slot 2410 to be slidably moved along the guide slot 2410. The guide unit 2400 can be installed in the length direction L of the first body 100 as well as in the width direction W of the first body 100. According to this configuration, when the second body 200 is slidably moved along a semi-circular path in its width direction W, the guide unit 2400 assists the slide module 2300 to guide the relative motion between the first body 100 and the second body 200, which allows the relative motion between the first and second bodies 100 and 200 to be performed along a more accurate path.

As shown in FIG. 20, the slide module 2300 is installed to be inclined by approximately 45° when the first body 100 and the second body 200 are at the closed position (see FIG. 1). Specifically, the first roller 2320 fixed to the first body 100 is fixed to an edge of one side surface of the first body 100 and the second roller 2330 fixed to the second body 200 is fixed to the central portion of the second body 200. Hence, the first roller 2320 and the second roller 2330 are aligned to be inclined by approximately 45°, although other angles could be equally suitable, with respect to the length direction L of the first and second bodies 100 and 200.

As a user pushes the side of the second body 200 in a direction indicated by an arrow F, as shown in FIG. 21, the second body 200 is slid along a semi-circular path P (see FIG. 3). When the second body 200 arrives at the intermediate position, the second body 200 is placed at a position moved by a certain distance respectively in the length direction L and the width direction W. As noted above, the guide slot 2410 may be configured to fix the guide protrusion 2420 thereat and causing the second body 200 to be temporarily stopped at the intermediate position, if so desired.

When the second body 200 is slid from the closed position to the intermediate position, the cam protrusion 2342 formed at each of the cam members 2341 and the 2345 is moved while being in contact with the cam surface 2346 of each of the first roller 2320 and the second roller 2330. That is, the cam protrusion 2342 is moved away from the concave part 2347 of the cam surface 2346 and moved toward the convex part 2348 thereof. Accordingly, the distance between the cam members 2341 and 2345 is increased at both edges of the rotation plate 2310 by being linearly moved in the length direction of the rotation plate 2310. At this point, the cam protrusion 2342 is positioned at the peak of the convex part 2348 of the cam surface 2346, and thereby the distance between the two cam members 2341 and 2345 is enlarged. Accordingly, the elastic member 2349 wounded around the cam members 2341 and 2345 is extended so as to accumulate an elastic force. When the second body 200 is moved over the intermediate position, the cam protrusion 2342 is moved toward the concave part 2347 along the cam surface 2346 by the elastic force of the elastic member 2349. As a result, the rotation plate 2310 is rotated over the remaining angle by the released elastic force, and the second body 200 is automatically moved toward the opened position.

As shown in FIG. 22, when the second body 200 is moved to the opened position, the second body 200 is placed at a position moved by a certain distance in the width direction W of the first body 100. Here, the cam protrusion 2342 of each of the cam members 2341 and 2345 is inserted into the concave part 2347 of the cam surface 2346 so as to maintain the opened state of the second body 200. When the second body 200 is slid toward the closed position, the slide module 200 is inversely operated.

Figure 23:
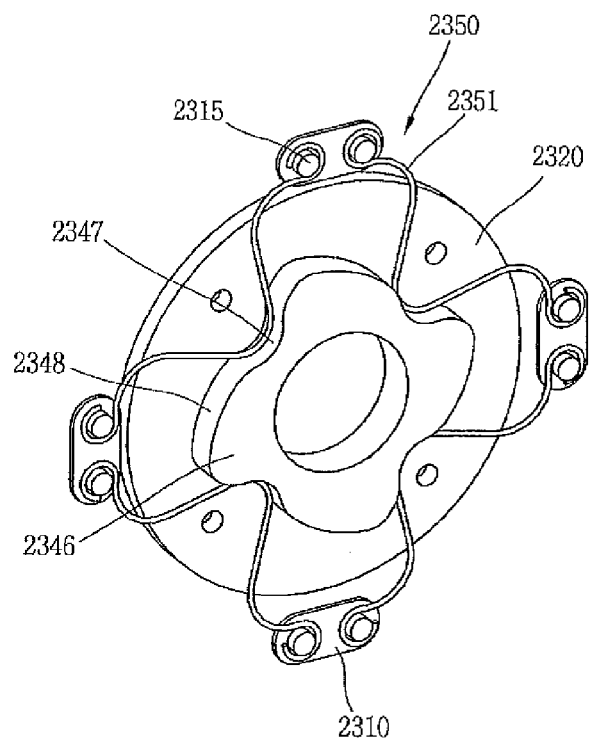
FIG. 23 is a perspective view of a modification of the sliding guide unit of FIG. 17.
Figure 24:
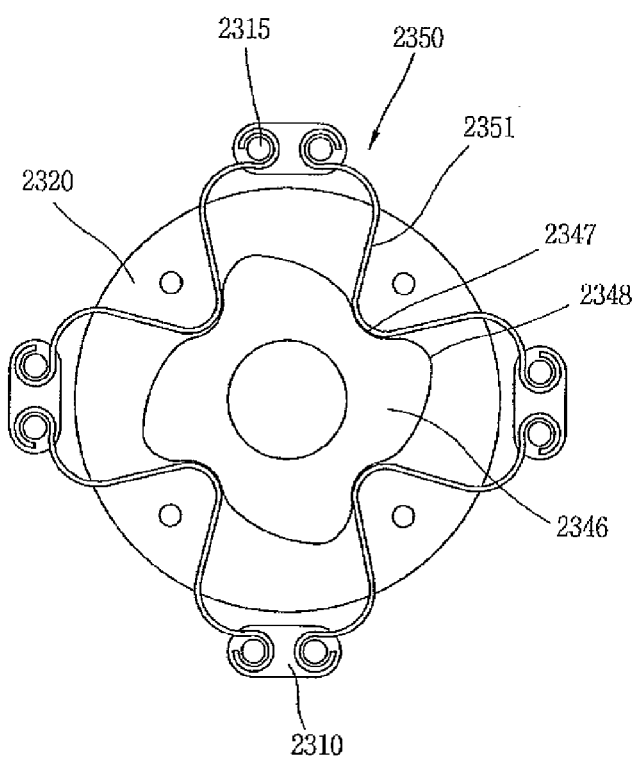
FIG. 24 is a plan view of the sliding guide unit of FIG. 23.

As shown in FIGS. 22 and 23, the aforementioned embodiment may be modified to provide a sliding guide unit 2350 that includes a cam surface 2346 disposed at one side surface of each of the first and second rollers 2320 and 2330 and a wire spring 2351 fixed to the rotation plate 2310 to be moved together with the rotation plate 2310 and contacted by the cam surface 2346. The cam surface 2346 includes a concave part 2347 and a convex part 2348.

The wire spring 2351 may include four individual springs, which are radially arranged in the circumferential direction of the rollers 2320 and 2330. The wire spring 2351 may have both ends fixed to fixing members 2315, which are located at the rotation plate 2310. The central portion of the wire spring 2351 is protruded to be convex, thereby being elastically contacted by the cam surface 2346.

Regarding the operation of the sliding guide unit 2350, when the second body 200 is slid in the width direction, the wire spring 2351 is rotated together with the rotation plate 2310 to be moved along the cam surface 2346. When the wire spring 2351 arrives at the peak of the convex part 2348 of the cam surface 2346, the wire spring 2351 is stretched to accumulate an elastic force. Thereafter, when the wire spring 2351 is passed through the peak of the convex part 2348 of the cam surface 2346, the wire spring 2351 is shrunk to apply the elastic force to the second body 200. Accordingly, the second body 200 can be automatically slid by a certain distance.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed:
1. A mobile terminal comprising:
a first body having a width and a length greater than the width, and having an exposed portion protruding from one longitudinal end of the first body and extending in a widthwise direction of the first body;
a second body slidably connected to the first body and moveable between a first position and a second position; and
a slide module configured to connect the first body to the second body, and configured to guide the second body along a predetermined curved path between the first position and the second position such that the second body moves in the widthwise direction with moving in a lengthwise direction of the first body,
wherein the slide module includes:
a guide slot located at one of the first and second bodies, and formed in a curved shape to define a curved route so as to guide the second body along the curved path;
a guide frame mounted at the other of the first and second bodies; and
a guide protrusion located on the guide frame and inserted into the guide slot to be moveable along the curved route, and wherein a central portion of the guide slot is formed closer to the exposed portion than both end portions of the guide slot and the guide frame is disposed to be adjacent to one side of said other of the first and second bodies such that the second body, sliding in a widthwise direction of the exposed portion, moves far from the exposed portion and then moves close to the exposed portion when moving from the first position to the second position.

2. The terminal of claim 1, wherein the first body includes a surface covered by the second body when in the first position, and the slide module is configured to guide the second body to move substantially parallel to the surface of the first body when moving between the first position and the second position.

3. The terminal of claim 1, further comprising a guide plate mounted at one of the first and second bodies, the guide plate having the guide slot formed therein.

4. The terminal of claim 3, further comprising a sliding guide unit configured to slide the second body such that the guide protrusion is moved from one end portion of the guide slot to the other end portion of the guide slot, as the second body is moved.

5. The terminal of claim 4, wherein the sliding guide unit comprises a member having one end connected to the guide plate and the other end connected to the guide protrusion to elastically move the guide plate with respect to the guide protrusion.

6. The terminal of claim 1, further comprising a cable electrically connecting the first body to the second body, wherein the guide protrusion is formed with a through hole, and the cable extends through the through hole.

7. The terminal of claim 1, further comprising a display located on an outer surface of the second body and configured to be touch-sensitive.

8. The terminal of claim 7, wherein the exposed portion has at least one key and at least one key is an activation key configured to receive a signal to activate the display.

9. The terminal of claim 1, further comprising a keypad arranged on an inner surface of the first body that is exposed when the second body is moved from the first position to the second position, and the keypad having a QWERTY configuration.

10. The terminal of claim 1, further comprising a camera located at at least one of an outer surface of the first body, a portion of an inner surface of the first body that is exposed when the second body is moved with respect to the first body, and an outer surface of the second body.

11. The terminal of claim 1, wherein more of the first body is exposed when in the second position compared to the first position, and the guide slot is exposed at an exterior of the terminal when the second body is in the second position.

12. The terminal of claim 1, wherein the second body does not include a mechanical key on an upper surface that moves with the second body.

13. The terminal of claim 7, wherein a receiver is located near one end portion of the display and a microphone is located at one of the first and second bodies.

14. The terminal of claim 1, wherein the second body is configured to overlap a portion of the first body in a thickness direction of the first body when in the second position.

15. The terminal of claim 3, wherein the guide plate is mounted at the second body, and the guide frame is mounted at the first body.

16. The terminal of claim 15, wherein the guide plate is mounted in a recessed portion formed at an inner surface of the second body in a screw-coupling manner.

17. The terminal of claim 15, wherein the guide frame is formed to extend in a lengthwise direction of the first body.

18. The terminal of claim 1, further comprising a side button disposed on a side surface of the first body.

19. The terminal of claim 18, wherein the side button is configured to operate a camera located at an outer surface of the first body to capture images.

20. The terminal of claim 18, further comprising a microphone located at the exposed portion of the first body.

21. The terminal of claim 1, further comprising an anti-separation unit installed at a free end of the guide protrusion and having an area larger than the width of the guide slot to prevent the guide protrusion from being separated from the guide slot.

22. The terminal of claim 3, further comprising a supporting link rotatably connected to the guide plate and the other of the first and second bodies, respectively, and configured to support a movement of the second body.

23. The terminal of claim 22, wherein one end portion of the supporting link is located at the lower side of the exposed portion.

24. The terminal of claim 22, wherein the supporting link is partially exposed to the outside when the second body moves between the first position and the second position.

* * * * *